United States Patent
Choi et al.

(10) Patent No.: US 10,134,200 B2
(45) Date of Patent: Nov. 20, 2018

(54) METHOD AND SYSTEM FOR CIG-MODE RENDERING

(71) Applicants: Bong Ouk Choi, Seoul (KR); Won-Young Lee, Seoul (KR)

(72) Inventors: Bong Ouk Choi, Seoul (KR); Won-Young Lee, Seoul (KR)

(73) Assignee: PHYSAN, INC., Seoul (KR)

( * ) Notice: Subject to any disclaimer, the term of this patent is extended or adjusted under 35 U.S.C. 154(b) by 0 days.

(21) Appl. No.: 15/641,740

(22) Filed: Jul. 5, 2017

(65) Prior Publication Data

US 2018/0012421 A1    Jan. 11, 2018

Related U.S. Application Data (60) Provisional application No. 62/359,126, filed on Jul. 6, 2016.

(51) Int. Cl.
 *G06T 15/04* (2011.01)
 *G06T 19/20* (2011.01)
 *G06T 15/00* (2011.01)

(52) U.S. Cl.
 CPC .......... *G06T 19/20* (2013.01); *G06T 15/005* (2013.01); *G06T 15/04* (2013.01); *G06T 2210/16* (2013.01)

(58) Field of Classification Search
 None
 See application file for complete search history.

(56) References Cited

U.S. PATENT DOCUMENTS

| | | | |
|---|---|---|---|
| 2010/0097395 A1* | 4/2010 | Chang | A63F 13/12 345/619 |
| 2011/0298897 A1* | 12/2011 | Sareen | G06N 3/006 348/47 |
| 2012/0086783 A1* | 4/2012 | Sareen | G06N 3/006 348/47 |
| 2014/0358738 A1* | 12/2014 | Ohnemus | G06Q 30/0643 705/27.2 |
| 2015/0154691 A1* | 6/2015 | Curry | G06Q 30/0643 705/27.2 |
| 2015/0269759 A1* | 9/2015 | Sekine | G06T 19/20 345/632 |
| 2017/0039775 A1* | 2/2017 | Applegate | G06T 7/30 |
| 2017/0046769 A1* | 2/2017 | Jackson | G06Q 30/0643 |
| 2017/0352092 A1* | 12/2017 | Mitchell | G06T 15/503 |

\* cited by examiner

*Primary Examiner* — Zhengxi Liu
*Assistant Examiner* — Yanna Wu
(74) *Attorney, Agent, or Firm* — John K. Park; Park Law Firm (57) ABSTRACT

A method for CIG-mode rendering in a virtual fitting system is provided. The method comprises step for: preparing a three-dimensional body, selecting a first garment for an outer and a second garment for an inner, assigning a plurality of inner-saver objects (ISOs), initializing all pixels of a stencil buffer for the screen; incrementing first pixels of the stencil buffer corresponding to interiors and RGB-drawing of the interiors, and the interiors comprise pixels of the outer or the inner, decrementing second pixels of the stencil buffer corresponding to exteriors and RGB-drawing of the exteriors, incrementing third pixels of the inner-saver objects and void-drawing the inner-saver objects; RGB-drawing forth pixels of the inner, where the stencil values are greater than zero.

15 Claims, 13 Drawing Sheets

Fig. 15 without CIG-mode render    with CIG-mode render

METHOD AND SYSTEM FOR CIG-MODE RENDERING

RELATED APPLICATION

This application is a Non-provisional Application of Provisional Application Ser. No. 62/359,126 for "Method and System for CIG-Mode Rendering" filed on Jul. 6, 2016.

BACKGROUND OF THE INVENTION

The present invention relates to a method and system for CIG-Mode rendering, which provides a rendering solution for showing virtual fitting of multiple garments from individual garments simulation.

A need for a method and system for CIG-Mode rendering has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a method and system for CIG-Mode rendering.

An aspect of the invention provides a method for CIG-mode rendering in a virtual fitting system.

The method comprises steps for: preparing a three-dimensional body, configured for a user, for displaying on a screen; selecting a first garment for an outer and a second garment for an inner, wherein the outer and the inner are put on the three-dimensional body and displayed simultaneously; assigning a plurality of inner-saver objects (ISOs), each of which being drawn with the outer and placed where a portion of the inner is exposed and protrudes past the outer legitimately; initializing all pixels of a stencil buffer for the screen; incrementing by one (1) first pixels of the stencil buffer corresponding to a plurality of interiors and RGB-drawing of the plurality of interiors, wherein the plurality of interiors comprise pixels of the outer or the inner, which is disposed for lining; decrementing by one (1) second pixels of the stencil buffer corresponding to a plurality of exteriors and RGB-drawing of the plurality of exteriors, wherein the plurality of exteriors comprise pixels of the outer or the inner, which are exposed outwards; incrementing by one (1) third pixels of the plurality of inner-saver objects and void-drawing the plurality of inner-saver objects; and RGB-drawing forth pixels of the inner, where the stencil values are greater than zero (0).

In the above, the RGB-drawing is to render objects on a color buffer, which is provided in the information processing device for displaying the garment. The void-drawing is just to draw on the stencil buffer, without rendering objects on the color buffer.

The three-dimensional body may be formed in terms of graphics in an information processing device, which comprises one or more information processing units, information storing units, and a display. The screen may be provided on the display, and the virtual fitting system may be operated on the information processing device in real-time.

In the illustrated embodiments, the system has been used, which comprises CPU: Intel® Core™ i7-6700 CPU @3.40 GHz, RAM: 16 GB, OS: Windows 10 64 bit, and GPU: NVIDIA GeForce GTX 960.

Each of the pixels of the stencil buffer may have a stencil value ranging from a predetermined minimum to a predetermined maximum. The predetermined minimum may be 0 and the predetermined maximum 255.

The stencil buffer is a 2D array and its width and height are same as a 3D window's (framebuffer). Each of the pixels of the stencil buffer's value may be 0~255 (8 bit). Pixels with Stencil value 0 are not to be rendered on the color buffer, and pixels with Stencil value 1~255 can be rendered on color buffer.

Each of the inner-saver objects may have a shape of cone.

Each of the outer and the inner may be provided with an independent garment simulation (IGS) configured for being displayed on the screen, and the IGS may be performed once in advance and data from the IGS is stored in the virtual fitting system.

The steps from initializing to incrementing the third pixels may be performed without knowing about the inner, and the step for RGB-drawing the forth pixels may be performed without knowing about the outer, and the step for RGB-drawing the fourth pixels may be performed after the steps from initializing to incrementing the third pixels.

In the above, it is to be understood that the stencil buffer needs to be manipulated in drawing the outer, while the inner is drawn just by consulting the stencil buffer, regardless of the exteriors or interiors of the outer.

One of the outer and the inner may comprise a top and the other comprises a pair of pants or a skirt.

The plurality of ISOs may be determined by a combination of the outer and the inner.

Some of the plurality of the ISOs may be configured to accommodate protrusions of the inner.

The shapes of the inner-saver objects may comprise a cone, a cylinder, and a sphere. The shape of the inner-saver object may have a cross-section of an ellipsis.

An opening of the inner-saver object may have a predetermined shape, so as to eliminate an artifact in the CIG-mode rendering.

Each of the outer and the inner may be provided with an independent garment simulation (IGS) configured for being displayed on the screen, and the IGS may be dynamic.

The steps may be configured for being implemented with one or more OpenGL hardwares in real-time.

The advantages of the present invention are: (1) the method and system for CIG-Mode rendering according to the invention provides a reliable rendering solution for showing virtual fitting of multiple garments from individual garments simulation, which can be run in real-time; and (2) the method according to the invention uses a unique and inventive features for the simultaneous display of multiple garments (the outfit).

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. Provisional Patent Application No. 62/359,126 for "Method and System for CIG-Mode Rendering" filed on Jul. 6, 2016 is incorporated by reference herein for any and all purposes.

Figure 1:
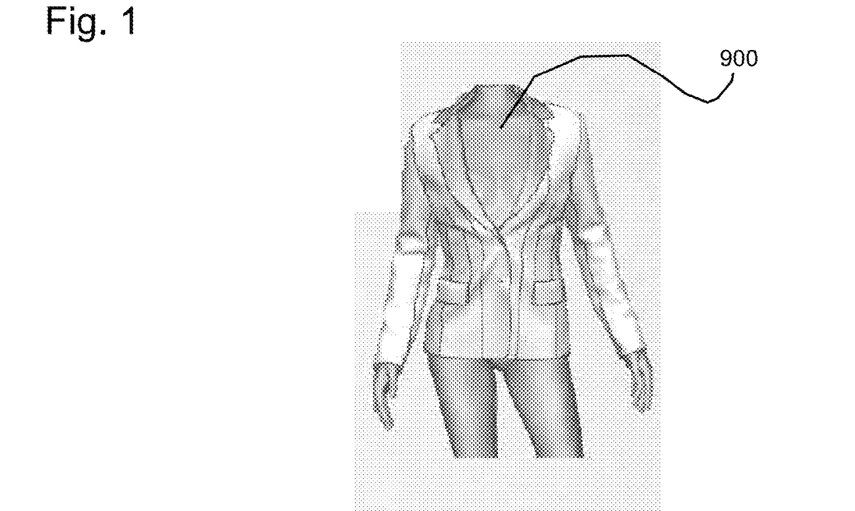
FIG. 1 is a perspective view showing a garment according to an embodiment of the invention.
Figure 2:
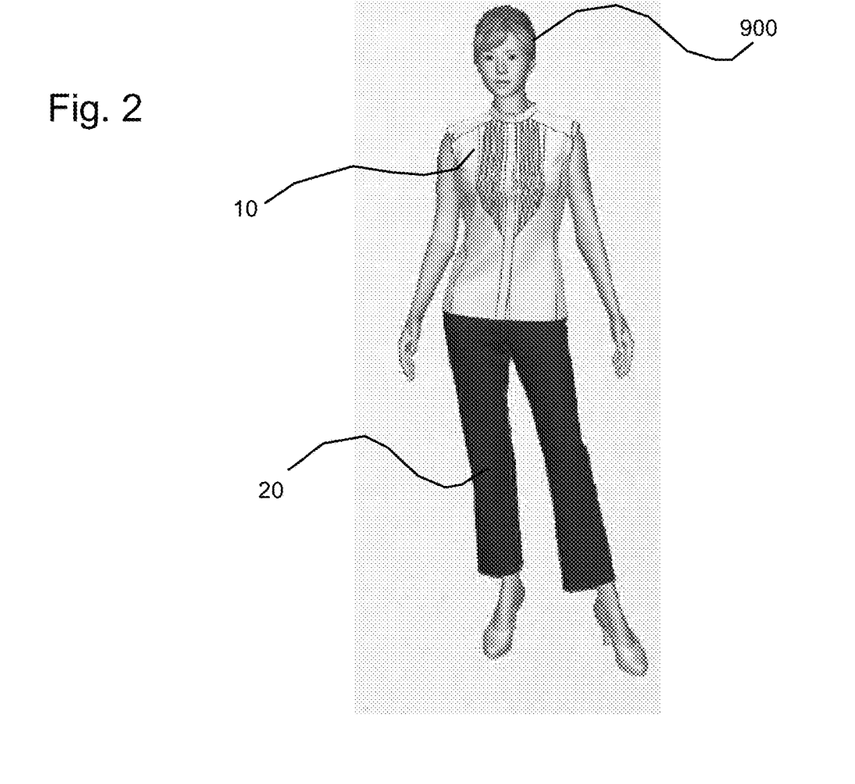
FIG. 2 is a perspective view showing a two-garment outfit according to another embodiment of the invention.

In FIGS. 1 and 2, the terms, Garment and Outfit, are described. A garment is a single dress piece created by sewing a set of panels. An outfit is a number of garments that are put on as a set to the avatar. In the illustrated embodiment, FIG. 1 is a garment, and FIG. 2 is a two-garment outfit.

The terms, Inner and Outer, are defined as follows. When two garments are put on together, in most cases we can tell which is inner and which is outer. For example, in the outfit shown in FIG. 2, the blouse is the outer and the pants is the inner. Note that the above ordering is defined between two garments. If the lady additionally wears a coat, between the coat and blouse, the coat is the outer and the blouse is the inner. Of course, between the coat and pants, the coat is the outer and the pants is the inner. There can exist exceptional cases in which the above out-to-in order cannot be well defined. For example, some upward protrusion from the pants may lie outer than the blouse. In such cases, the method proposed in this patent may produce regionally undesired results.

The terms, Product and e-product, are defined as follows. The physical thing such as garment or outfit that is being sold is referred to as a product. Its digital version is called e-product. When it is clear from the context, from time to time product will mean e-product.

Also, we will use the term user to include both the consumer and the retailer.

The CIG-mode render may be applied to the following technical situations. Consider the virtual fitting (VF) system that shows the garments by putting them on the avatar as demonstrated in FIG. 3. The VF system prepares the 3D body of the customer. As the customer selects a set of garments, the VF system shows the e-garments put on the body. Note that the e-garment set should be displayed simultaneously (as an outfit).

The CIG-mode render algorithm may be used as follows. It is used for the simultaneous display of multiple garments (the outfit). Showing them simultaneously sounds too obvious, but doing it involves a critical technical challenge.

Problems in Showing an Outfit are as follows.

Suppose the case in which the user puts on a top (e.g., shirt) and a bottom (e.g., pants or skirt) simultaneously. The two garments interfere each other. When the top is tucked out, the top can touch the bottom. When the top is tucked in, the top can be squeezed between the bottom and the body. To show their physical interference, the physical simulator has to do a lot of work.

Producing a natural-looking drape of two interfering garments is quite challenging even when (1) the state-of-the-art clothing simulator is employed and (2) an expert is present and monitor the simulation process. (If satisfactory simulation of interfering garments could be done in real-time without the presence of a clothing expert, the CIG-mode rendering would not need to be developed for the realization of VF.)

It would be magical if individual garments can be simulated independently without considering the interference with other garments (we will call it independent garment simulation (IGS)), then some algorithm can put the IGSs together to show them as an outfit. The CIG-mode rendering is developed to realize this magic.

High-quality simulation of garments can't be done in real-time, especially when they are interfering each other. That said, one way of running a VF system is to perform pre-simulation. If Ntop tops and Nbottom bottoms exist in the VF system, since the interfering pattern will be different for every pair, the pre-simulation has to be performed for all Ntop×Nbottom combinations. If another type of garments (e.g., jackets) should be considered in addition to the tops and bottoms, then the combination increases even further (i.e., Ntop×Nbottom×Njacket). We will call the above problem as the combinatorial explosion. In developing a pre-simulation based VF system, the combinatorial explosion is a significant issue.

CIG-mode rendering can make the VF system work with Ntop+Nbottom+Njacket IGSs, instead of Ntop×Nbottom×Njacket outfit pre-simulations. This patent would like to highlight that, practically, a pre-simulation based VF system is impossible without the CIG-mode rendering.

The present invention proposes a novel method, CIG-mode rendering, to be able to simulate each garment independently from other garments, but the user can still try on all the combinations of the garments without any further simulation. The acronym CIG came from "Composite Individual Garments".

In spite of such a practical significance, no algorithm of this kind has ever been proposed.

The community and the clothing researchers, including ourselves who have been studying the virtual fitting for the past two decades, have not conceived such an image-based solution yet. Rather, they have been trying to achieve the purpose by improving the physically-based simulator and collision handling techniques.

The first contribution of the present invention is to provide a new way of displaying multiple interfering garments in terms of IGSs.

As for the second contribution, if the proposed idea has to be implemented by a pixel manipulation software, then the resultant technique will be too slow. This patent proposes how the proposed idea can be implemented with the contemporary OpenGL hardware so as to make it work in real-time.

Figure 4:
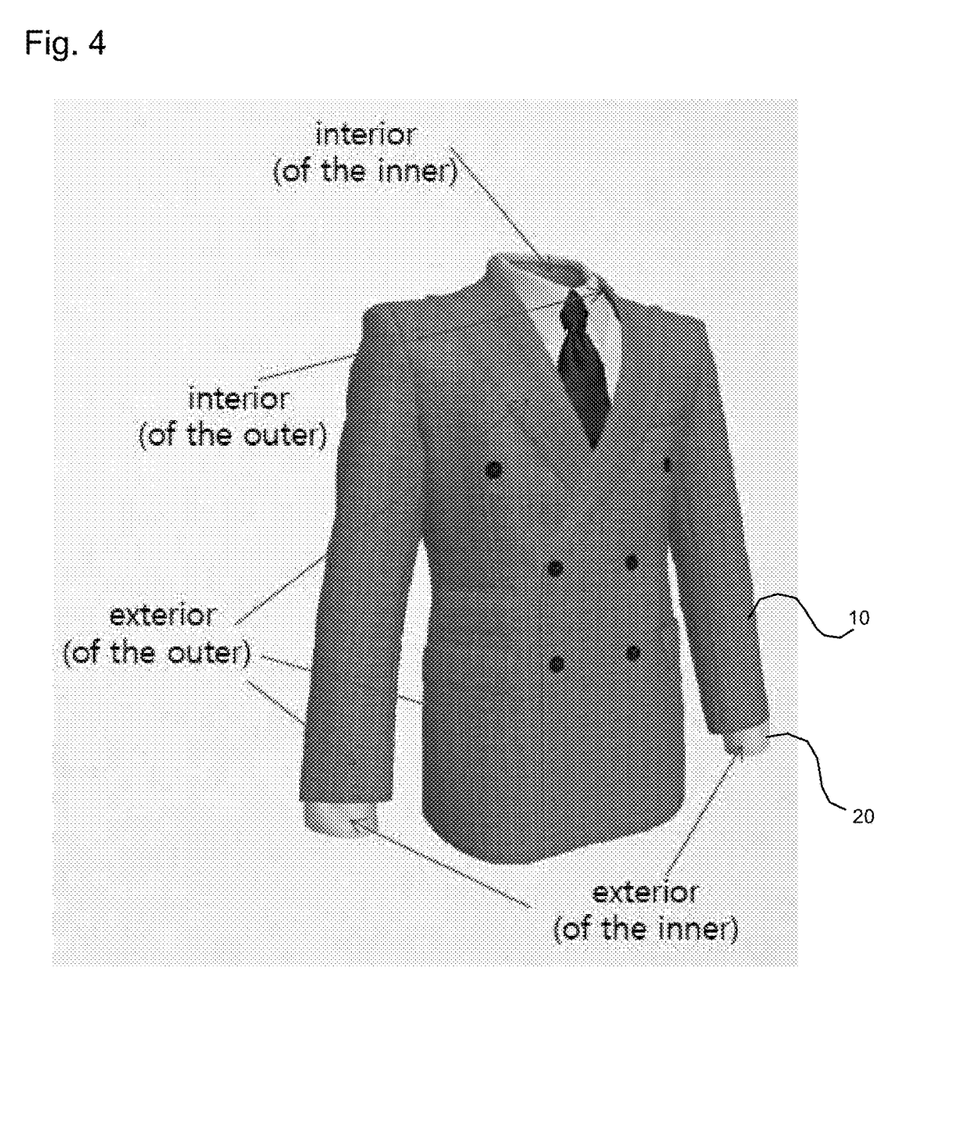
FIG. 4 is a perspective view of a rendered image showing various regions for an outer and an inner according to still another embodiment of the invention.

FIG. 4 shows naming of various regions of a rendered image (In the Figure, Outer=Jacket, Inner=Shirt+Tie). In the image of a garment, the regions (i.e. the pixels) that show the outside of the garment are called exterior. The other parts of the image (e.g., the pixels for the lining) are called the interior. Note that lapel is classified as exterior.

Suppose a naïve algorithm 1, which has steps to:
1. Initialize the whole stencil buffer with 1 (white).
2. As RGB-drawing the outer, 0-draw the stencil buffer.
3. RGB-draw the inner only where the stencil value is 0.

Figure 5:
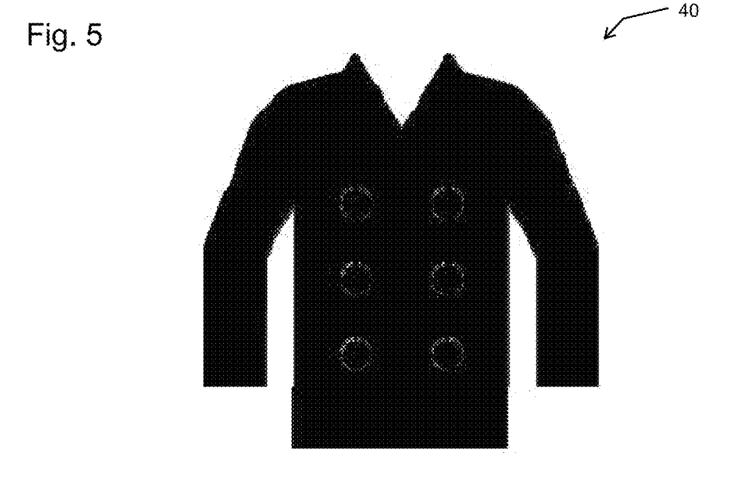
FIG. 5 is a stencil buffer for a garment according to still another embodiment of the invention.
Figure 6:
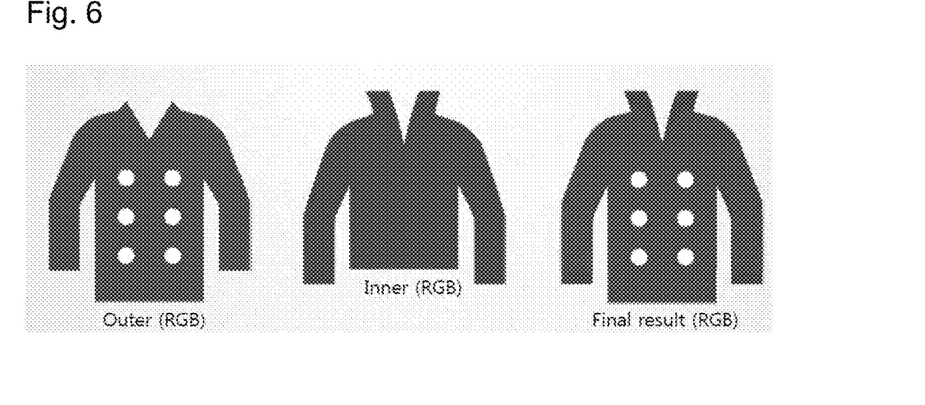
FIG. 6 shows RGB drawing of an outer and an inner according to still another embodiment of the invention.

FIG. 5 shows the stencil buffer after Step 2 and FIG. 6 shows RGB-drawings of Outer, Inner, and the combined final result.

Figure 7:
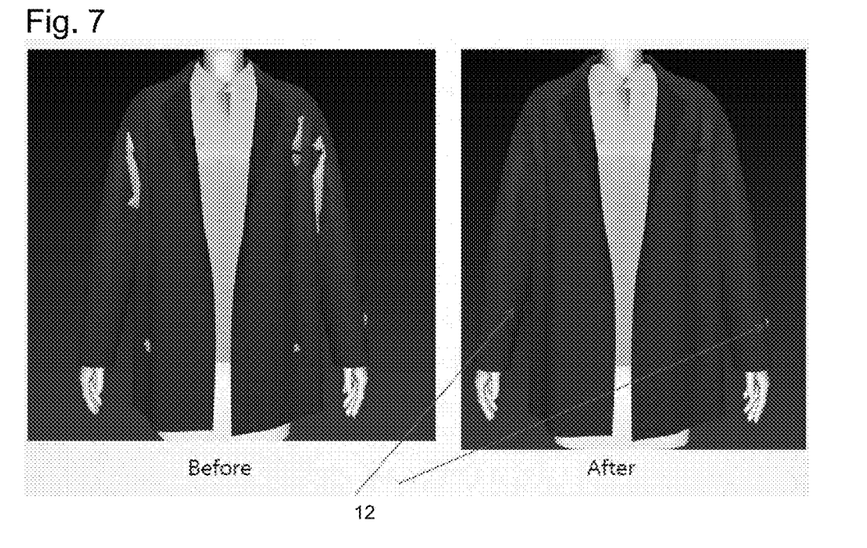
FIG. 7 shows results before and after a naive algorithm.

FIG. 7 shows the results before and after the Naïve Algorithm 1. Image 12 of the inner that lies outside of the outer's silhouette is not removed.

In contrast, Naïve Algorithm 2 is same as Naïve Algorithm 1, except that Naïve Algorithm 2 draws the inner only for the inside of the outer's silhouette.

Figure 8:
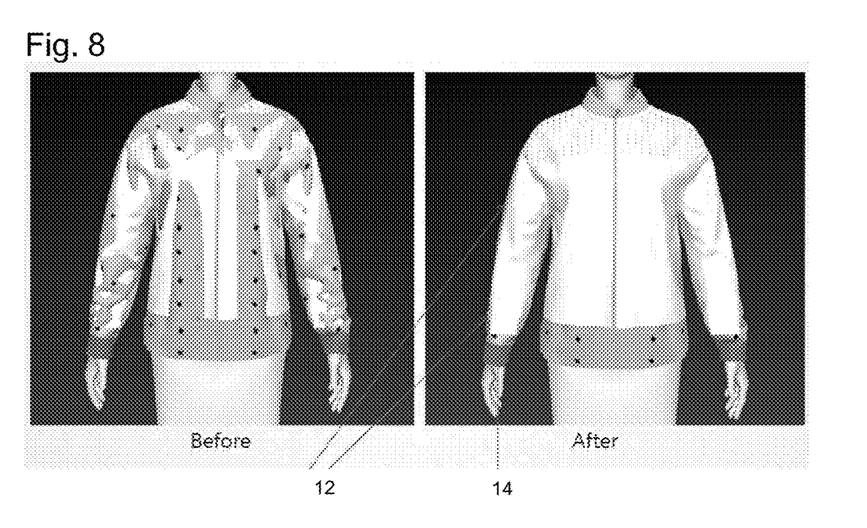
FIG. 8 shows another results before and after another naive algorithm.

FIG. 8 shows another results before and after Naïve Algorithm 1. Naïve Algorithm 2 will remove the protrusions 12. Unfortunately, Naïve Algorithm 2 removes the portion 14, too, which shouldn't have been removed.

Figure 9:
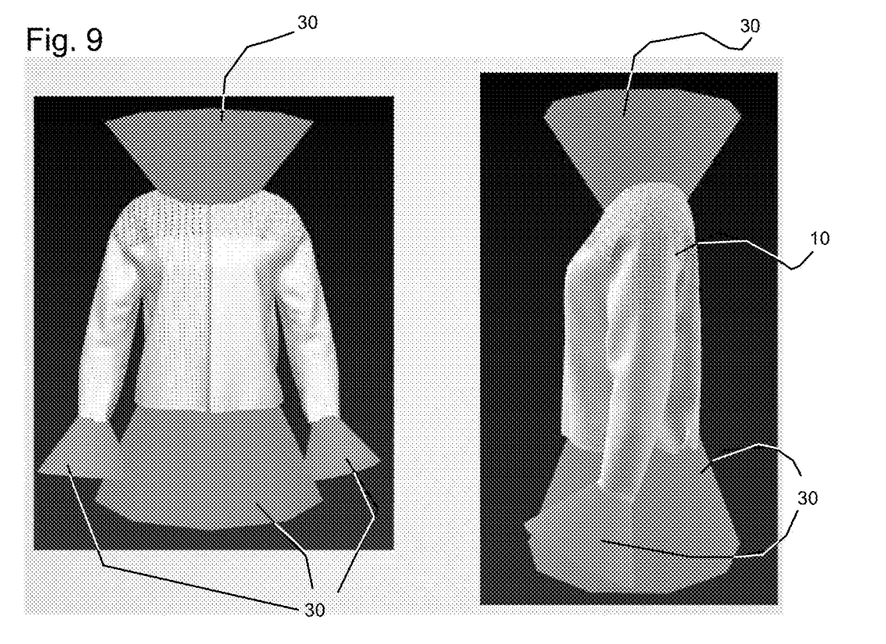
FIG. 9 shows inner-saver objects according to still an embodiment of the invention.

In order to solve the above problems, a novel concept called the inner-saver object (ISO) is introduced as shown in FIG. 9. The inner saver object is a 3D object (theoretically it can be a 2D image, but to make the CIG-mode render algorithm to run in OpenGL hardware, we hereafter explain the case when it is defined as a 3D object) that is drawn with the outer when rendering the stencil buffer. An example is shown in FIG. 9, in which cones were used for the inner-saver object. Note that the cones are placed where the inner can legitimately come out. By introducing the inner-saver objects, we can make the inner portions that can legitimately protrude the outer drawn.

The CIG-Mode Render Algorithm may be given as follows.
(A) Rendering of the outer: RGB-draw and stencil-draw the interior and exterior of the outer and the inner-saver objects in the following steps:
1. Initialize the whole stencil buffer to 0.
2. As RGB-drawing the interior, increment (by 1) corresponding stencil pixels.
3. As RGB-drawing the exterior, decrement (by 1) corresponding stencil pixels.
4. As void-drawing the inner-saver objects, increment (by 1) corresponding stencil pixels.
(B) Rendering of the inner: RGB-draw the inner only where the stencil value is greater than 0.

Figure 10:
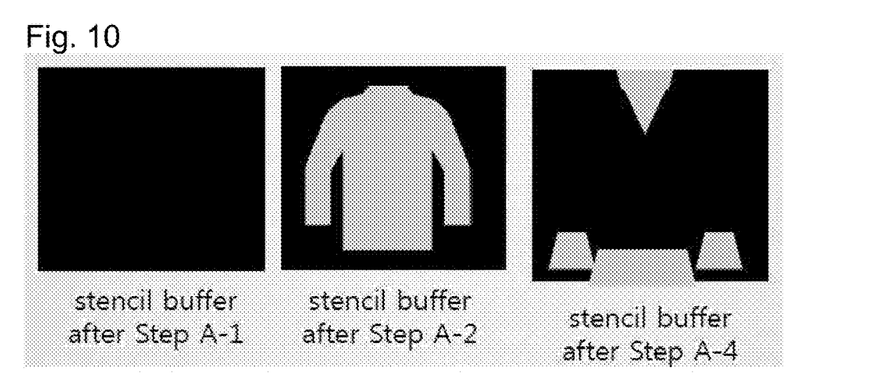
FIG. 10 shows a stencil buffer changing with steps of a CIP-mode render algorithm according to another embodiment of the invention.

FIG. 10 shows the stencil buffers after steps.

In the above, the following points may be recognized.

Part A is performed without knowing what will be the inner.

Part B is performed without knowing what is the outer.

The only constraint here is that Part B should be performed after Part A.

Figure 11:
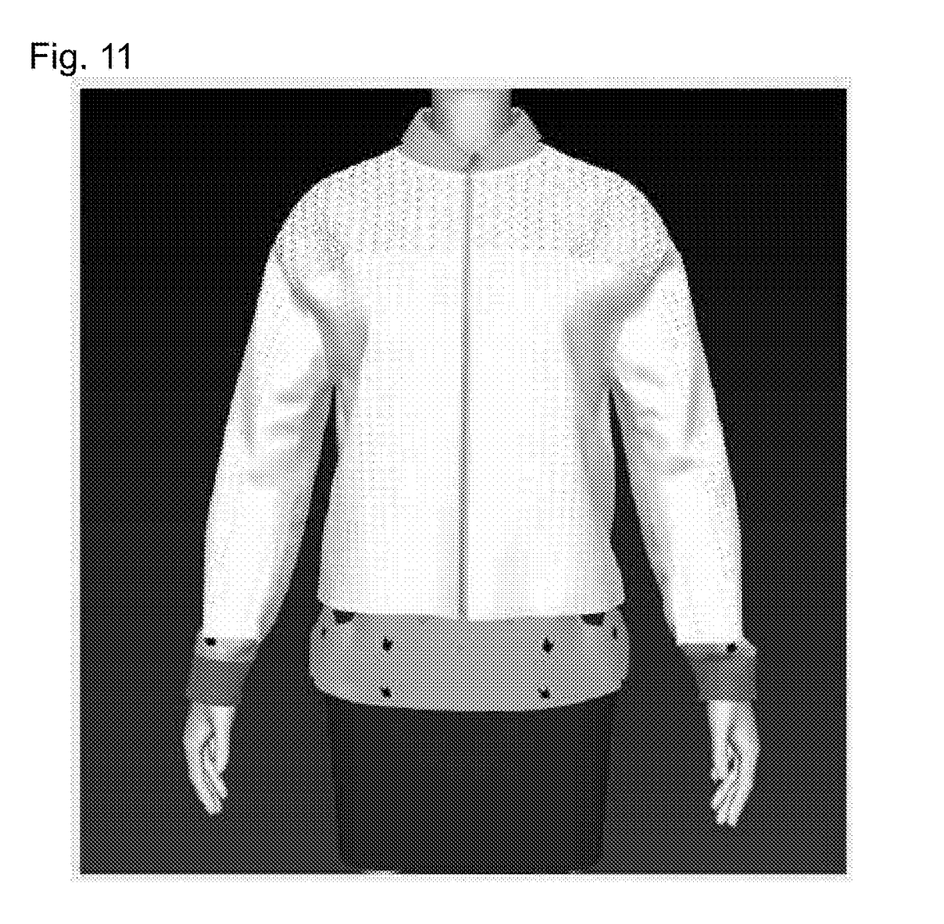
FIG. 11 shows a result produced with a CIG-mode render according to still another embodiment of the invention.

FIG. 11 shows a result produced with the CIG-mode render.

Figure 12:
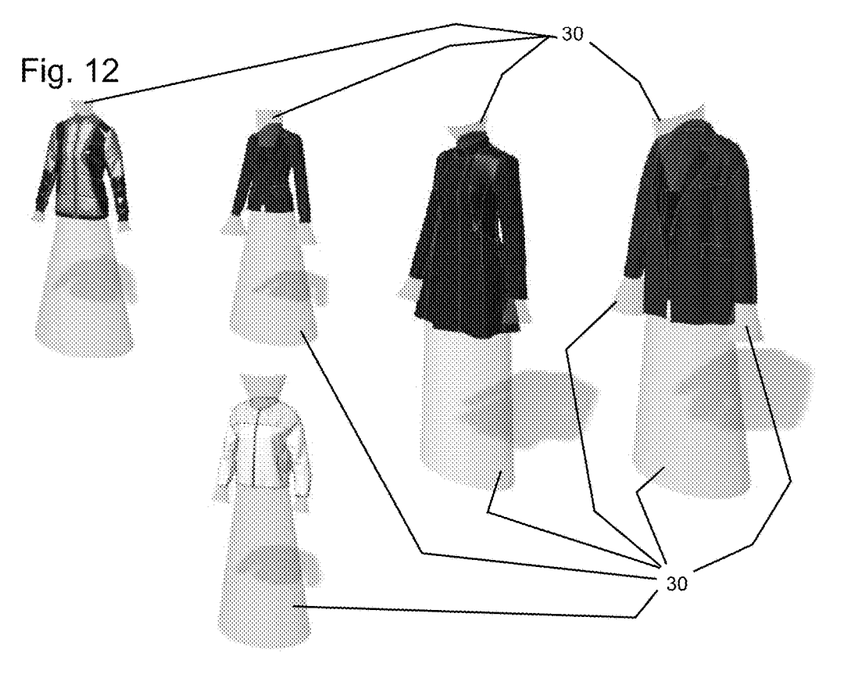
FIG. 12 shows a plurality of inner-saver object cones positioned for a few sample outers according to still another embodiment of the invention.
Figure 13:
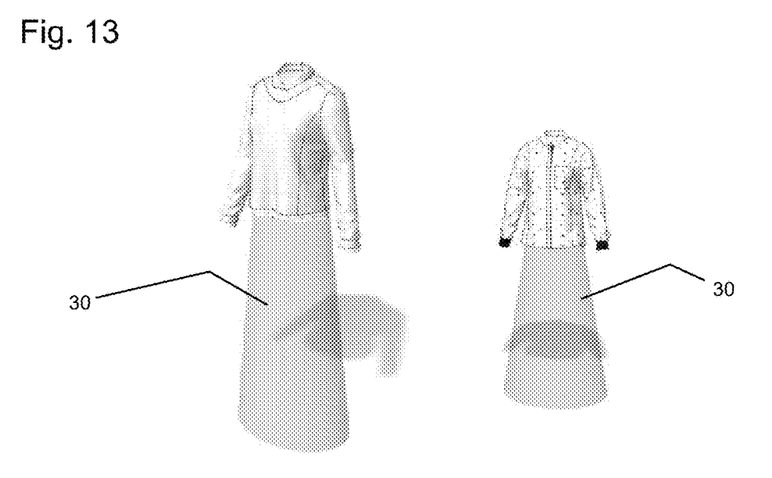
FIG. 13 shows inner-saver object cones positioned for a few sample tops according to still another embodiment of the invention.

FIGS. 12 and 13 show various cones positioned for a few Sample outers and sample tops.

The CIG-mode render can extend to any inner and outer pair (e.g., top-and-pants, top-and-skirt) by introducing appropriate inner-saver objects.

A three (or more) garment outfit case can be covered with the CIG-mode render by decomposing the case into several inner-outer relationships.

Objects of different shapes (e.g., cones, cylinders, spheres, and to be more general, the cross section of those shapes can take an elliptic shape) can be used for the inner-saver object (ISO) to accommodate various protrusions of the inner.

Note that, although the ISO is used to retain the protrusions of the inner, its use should be done with the outer, i.e., in Part A of the CIG-mode render algorithm.

One solution to this problem is to perform Part A in a number of versions (each version using a different ISO), so that in performing Part B, the renderer can choose the most suitable version for the current inner.

If the shape of the opening does not fit to the cone (due to some wrinkles, etc.), the CIG-mode rendering can exhibit some artifact. To control the shape of the opening, we can use some fixtures for the simulation, so that the lower end of the sleeve for example comes to a certain predetermined shape.

Figure 14:
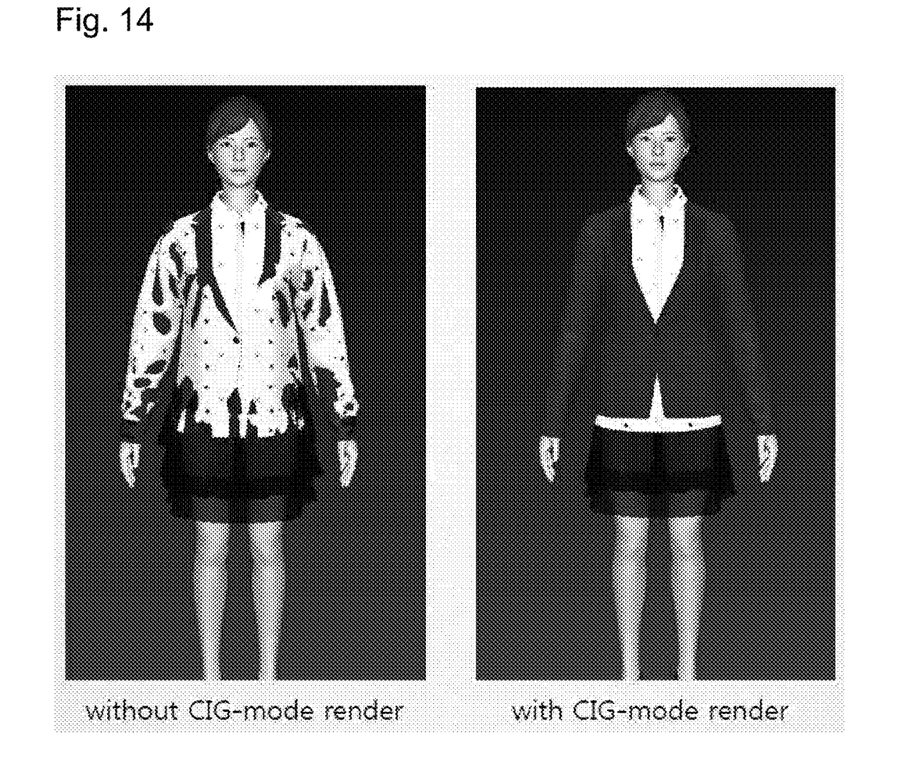
FIG. 14 shows a result of a CIG-mode render for jacket according to still another embodiment of the invention.
Figure 15:
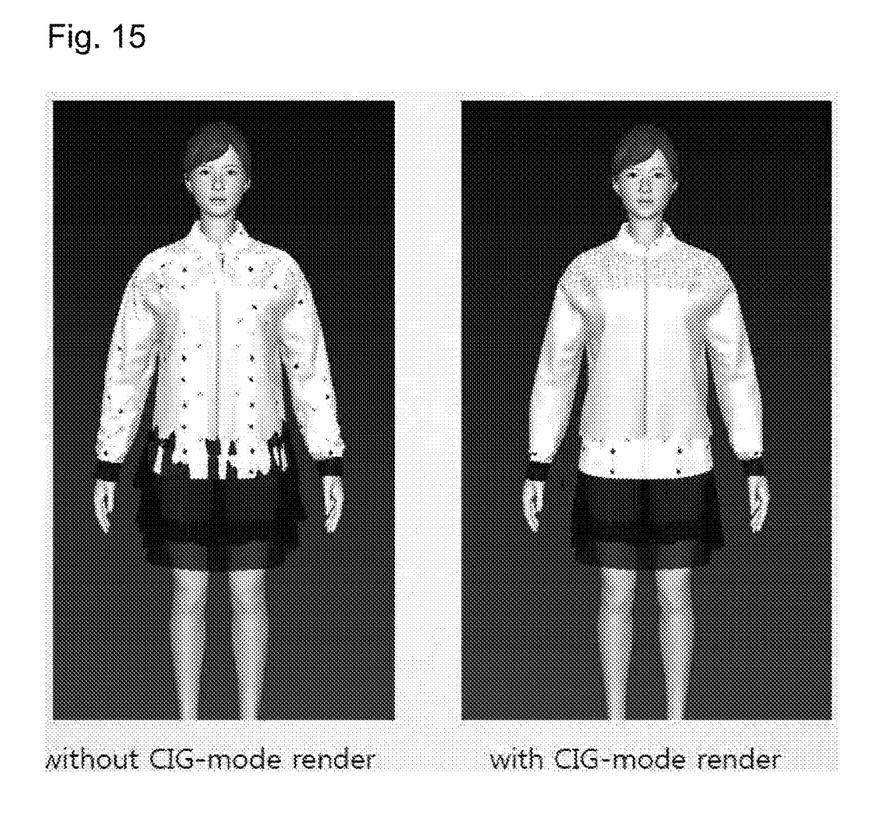
FIG. 15 shows a result of a CIG-mode render for jumper according to still another embodiment of the invention.
Figure 16:
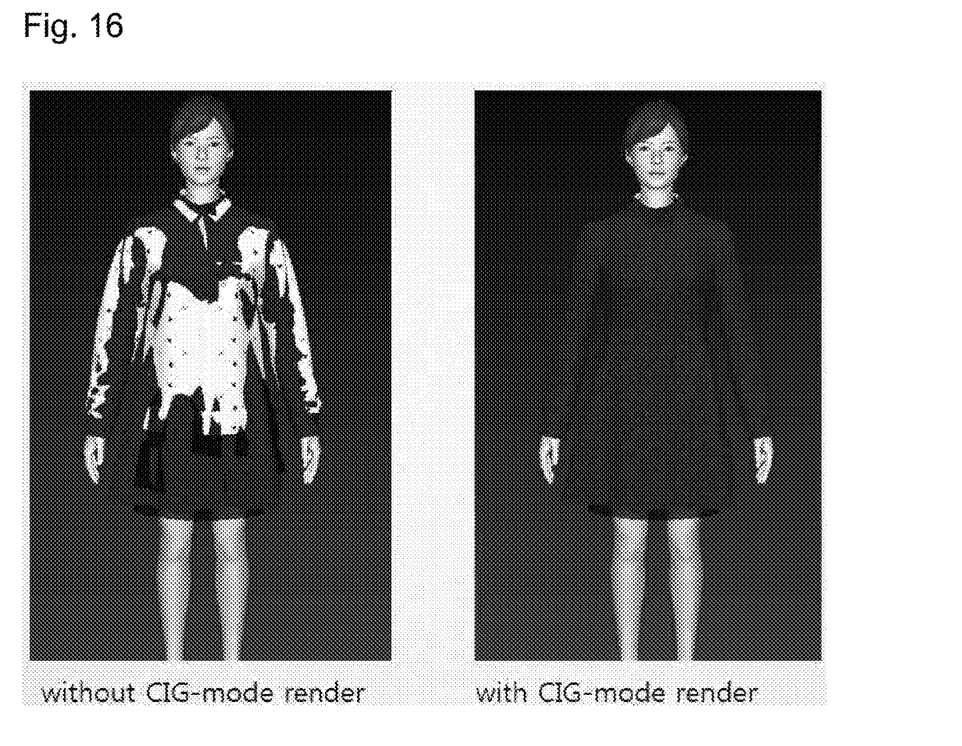
FIG. 16 shows a result of a CIG-mode render for coat according to still another embodiment of the invention.

FIGS. 14-16 show results for jacket, jumper, and coat for Outer.

Figure 17:
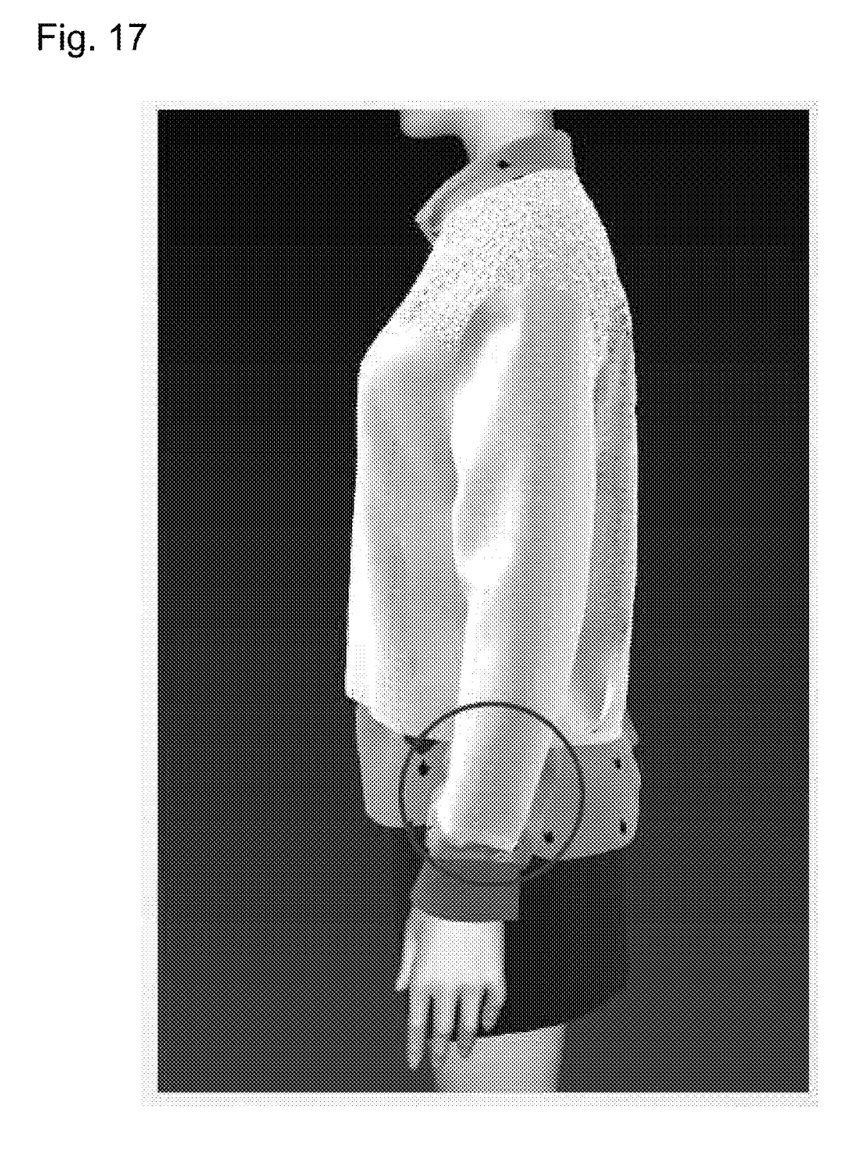
FIG. 17 shows another result of a CIG-mode render.

The CIG-Mode Render may produces wrong results when it is seen from a certain view in which the image regions of two or more inner-saver objects overlap, as demonstrated in the left sleeve of the figure on the right.

Therefore, in the practical use, such views should be avoided as much as possible. It is a fundamental drawback of the proposed stencil based algorithm. A software solution (such as placing a plane between the wrist and waist) can be considered. But it is not a hardware solution. Therefore, it may not run in real-time in the contemporary OpenGL architecture.

The inner-saver objects need to be carefully located with respect to the resultant static drape.

The CIG-mode render is suitable for combining static (i.e., fixed) IGSs. To combine dynamic (i.e., moving) IGSs, ISOs should be used that automatically position or deform according to the result of the dynamic simulation.

The CIG-mode render work may be used for combining dynamic IGSs. The essence of the idea is the ISOs should be positioned or deformed according to the result of the simulation.

Let's take the left sleeve of a jacket for example. Instead of using rigid cones, at the lower end of the sleeve, we can attach a cylindrical fabric that is completely transparent and has near-zero-mass and no air resistance (so that it does not affect the physical movement of the sleeve). We simulate the jacket with the attachment, so that the attachment is draped under the influence of the gravity, inertia, etc. By making the dynamic draping of the attachment do the role of the ISO, the CIG-mode render can be made to work for combining dynamic IGSs. We will call the above idea as the drapable ISO.

The drapable ISO works for the Λ-cones (the cones for the two sleeves and lower end of the jacket. It is named as such since the cone's bottom is down.). But the drapable ISO does not work quite well for V-cones (the cones used for the neck protrusions. It is named as such since the cone's bottom is up).

The essence of this extension is that the ISO should move according to the result of the simulation. There are two ways ISO can be coherent with the simulation: (1) ISO is coherent with the clothing movement (drapable ISO), (2) ISO is coherent with the body motion. We call the latter as the body-attached ISO. Drapable ISO is preferred whenever applicable, since it more accurately captures the legitimate protrusion. The body-attached ISO can be considered for the V-cones.

Referring to the figures, the embodiments of the invention are described in detail.

Figure 18:
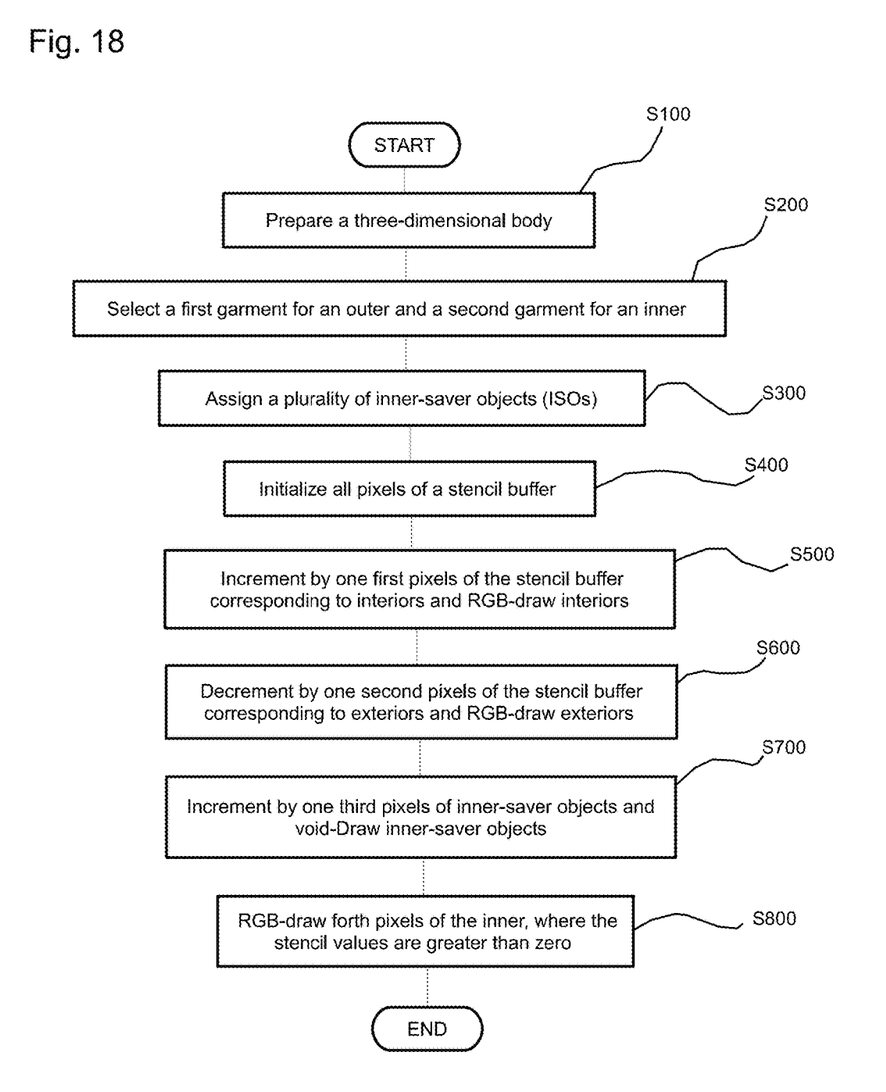
FIG. 18 is a flow chart showing a CIG-mode rendering according to an embodiment of the invention.

FIGS. 1-17 show details and aspects of a CIG-mode rendering according to embodiments of the invention, and FIG. 18 shows a flow chart of the CIG-mode rendering according to an embodiment of the invention.

An aspect of the invention provides a method for CIG-mode rendering in a virtual fitting system 1.

As shown in FIG. 18, the method comprises steps for: preparing a three-dimensional body 900, configured for a user, for displaying on a screen 2 (S100); selecting a first garment 10 for an outer and a second garment 20 for an inner, where the outer 10 and the inner 20 are put on the three-dimensional body 900 and displayed simultaneously (S200); assigning a plurality of inner-saver objects (ISOs) 30, each of which being drawn with the outer 10 and placed where a portion of the inner 20 is exposed and protrudes past the outer 10 legitimately (S300); initializing all pixels of a stencil buffer 40 for the screen 2 (S400); incrementing by one (1) first pixels of the stencil buffer 40 corresponding to a plurality of interiors and RGB-drawing of the plurality of interiors, and the plurality of interiors comprise pixels of the outer 10 or the inner 20, which is disposed for lining (S500); decrementing by one (1) second pixels of the stencil buffer 40 corresponding to a plurality of exteriors and RGB-drawing of the plurality of exteriors, and the plurality of exteriors comprise pixels of the outer 10 or the inner 20, which are exposed outwards (S600); incrementing by one (1) third pixels of the plurality of inner-saver objects 30 and void-drawing the plurality of inner-saver objects 30 (S700); RGB-drawing forth pixels of the inner 20, where the stencil values are greater than zero (0) (S800).

As the other graphical entities such as garments, the reference body, etc., the stencil buffer 40 can be made and stored electronically in an information processing device, and also it can be displayed as shown in FIG. 5.

The three-dimensional body 900 may be formed in terms of graphics in the information processing device, which comprises one or more information processing units, information storing units, and a display. The screen 2 may be provided on the display, and the virtual fitting system 1 may be operated on the information processing device in real-time. The information processing device and its components themselves are omitted because they are well known to the community. However, we submit that the features including the steps for manipulating the physical resources for the graphical entities are all inventive, for the steps and the produced and manipulated graphical entities can be transformed to real and physical things that are novel and useful in the real world.

Each of the pixels of the stencil buffer 40 may have a stencil value ranging from a predetermined minimum to a predetermined maximum. The predetermined minimum may be 0 and the predetermined maximum 255.

Each of the inner-saver objects 30 may have a shape of cone.

Figure 3:
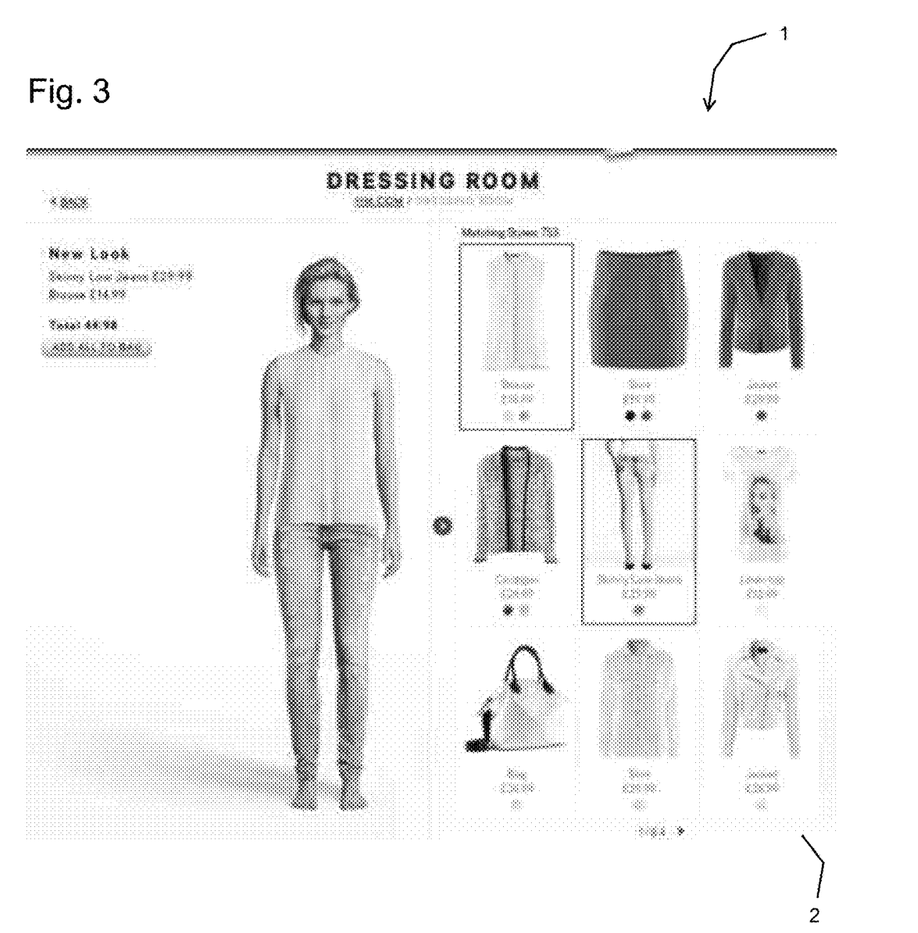
FIG. 3 is a screen shot showing a virtual fitting system according to still another embodiment of the invention.

Each of the outer 10 and the inner 20 may be provided with an independent garment simulation (IGS) configured for being displayed on the screen 2, and the IGS may be performed once in advance and data from the IGS can be stored in the virtual fitting system 1. Of course, the VF 1 shown in FIG. 3 is as displayed on the screen 2, but the VF 1 itself may comprise a plurality of complicated information processing modules configured for performing and supporting functions for the method according to embodiments of the invention.

The steps from initializing to incrementing the third pixels may be performed without knowing about the inner 20, and the step for RGB-drawing the forth pixels may be performed without knowing about the outer 10, and the step for RGB-drawing the fourth pixels may be performed after the steps from initializing to incrementing the third pixels.

One of the outer 10 and the inner 20 may comprise a top and the other comprises a pair of pants or a skirt.

The plurality of ISOs 30 may be determined by a combination of the outer 10 and the inner 20.

Some of the plurality of the ISOs 30 may be configured to accommodate protrusions of the inner 20.

The shapes of the inner-saver objects 30 may comprise a cone, a cylinder, and a sphere. The shape of the inner-saver object 30 may have a cross-section of an ellipsis.

An opening of the inner-saver object 30 may have a predetermined shape, so as to eliminate an artifact in the CIG-mode rendering.

Each of the outer 10 and the inner 20 may be provided with an independent garment simulation (IGS) configured for being displayed on the screen 2, and the IGS may be dynamic.

The steps may be configured for being implemented with one or more OpenGL hardwares in real-time.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for Composite Individual Garments (CIG)-mode rendering in a virtual fitting system, the method comprising steps for:

preparing a three-dimensional body, configured for a user, for displaying on a screen;

selecting a first garment for an outer and a second garment for an inner, wherein the outer and the inner are put on the three-dimensional body and displayed simultaneously;

assigning a plurality of inner-saver objects (ISOs), each of which being drawn with the outer and placed where a portion of the inner is exposed and protrudes past the outer legitimately;

initializing stencil values of all pixels of a stencil buffer for the screen to zero (0);

incrementing stencil values of first pixels of the stencil buffer by one (1) the first pixels of the stencil buffer corresponding to a plurality of interiors and RGB-drawing of the plurality of interiors, wherein the plurality of interiors comprise pixels of the outer or the inner, which is disposed for lining;

decrementing stencil values of second pixels of the stencil buffer by one (1), the second pixels of the stencil buffer corresponding to a plurality of exteriors and RGB-drawing of the plurality of exteriors, wherein the plurality of exteriors comprise pixels of the outer or the inner, which are exposed outwards;

incrementing stencil values of third pixels of the stencil buffer by one (1) the third pixels of the plurality of inner-saver objects and void-drawing the plurality of inner-saver objects; and RGB-drawing fourth pixels of the inner, when stencil values of the fourth pixels are greater than zero (0).

2. The method of claim 1, wherein the three-dimensional body is formed in terms of graphics in an information processing device, which comprises one or more information processing units, information storing units, and a display, wherein the screen is provided on the display, and wherein the virtual fitting system is operated on the information processing device in real-time.

3. The method of claim 1, wherein each of the pixels of the stencil buffer has a stencil value ranging from a predetermined minimum to a predetermined maximum.

4. The method of claim 3, wherein the predetermined minimum is 0 and the predetermined maximum is 255.

5. The method of claim 1, wherein each of the inner-saver objects has a shape of cone.

6. The method of claim 1, wherein each of the outer and the inner is provided with an independent garment simulation (IGS) configured for being displayed on the screen, and wherein the IGS is performed once in advance and data from the IGS is stored in the virtual fitting system.

7. The method of claim 1, wherein the steps from initializing to incrementing the third pixels are performed without knowing about the inner, wherein the step for RGB-drawing the fourth pixels is performed without knowing about the outer, and wherein the step for RGB-drawing the fourth pixels is performed after the steps from initializing to incrementing the third pixels.

8. The method of claim 1, wherein one of the outer and the inner comprises a top and the other comprises a pair of pants or a skirt.

9. The method of claim 8, wherein the plurality of ISOs are determined by a combination of the outer and the inner.

10. The method of claim 9, wherein some of the plurality of the ISOs are configured to accommodate protrusions of the inner.

11. The method of claim 1, wherein shapes of the inner-saver objects comprise a cone, a cylinder, and a sphere.

12. The method of claim 11, wherein the shape of the inner-saver object has a cross-section of an ellipsis.

13. The method of claim 11, wherein an opening of the inner-saver object has a predetermined shape, so as to eliminate an artifact in the CIG-mode rendering.

14. The method of claim 1, wherein each of the outer and the inner is provided with an independent garment simulation (IGS) configured for being displayed on the screen, and wherein the IGS is dynamic.

15. The method of claim 1, wherein the steps are configured for being implemented with one or more OpenGL hardwares in real-time.

* * * * *